United States Patent

Rindos, III et al.

Patent Number: 5,493,673
Date of Patent: Feb. 20, 1996

[54] METHOD AND APPARATUS FOR DYNAMICALLY SAMPLING DIGITAL COUNTERS TO IMPROVE STATISTICAL ACCURACY

[75] Inventors: Andrew J. Rindos, III, Durham; Steven P. Woolet, Raleigh, both of N.C.

[73] Assignee: International Business Machines Corporation, Armonk, N.Y.

[21] Appl. No.: 217,335

[22] Filed: Mar. 24, 1994

[51] Int. Cl.⁶ .................................................... G06F 11/30
[52] U.S. Cl. ............................... 395/550; 364/DIG. 2; 364/942.7; 364/933.3; 364/939.6; 364/949.5; 395/184.01
[58] Field of Search ...................................... 395/550, 575, 395/183.14, 184.01, 872, 873, 876, 880; 364/DIG. 2

[56] References Cited

U.S. PATENT DOCUMENTS 4,996,871   3/1991   Romano .
5,067,107   11/1991  Wade ................................ 364/DIG. 2

OTHER PUBLICATIONS

Article Entitled "Technique for Managing Network Counters" By D. R. Irvin et al, IBM Technical Disclosure Bulletin, vol. 33, No. 6B, Nov. 1990, pp. 72–75.
Article Entitled "Internal Performance Measurement Counters" By J. E. Bahr et al, IBM Technical Disclosure Bulletin, vol. 34, No. 4A, Sep. 1991, pp. 51–52.
Article Entitled "Two–Stage Method for Managing Link–Performance Counters" By D. R. Irvin, vol. 35, No. 7, Dec. 1992, pp. 103–107.

*Primary Examiner*—Thomas M. Heckler
*Attorney, Agent, or Firm*—Jerry W. Herndon

[57] ABSTRACT

An improved data collection method and apparatus wherein the data is accumulated in groups of storage means as the data is generated, and the data in each group of storage means is transferred to another store at a rate that is determined at least in part by the rate at which data was accumulated. In the event that data is generated faster than it is being transferred, data is not lost but data granularity is reduced. After being transferred to another store, the data is available for statistical analysis by application programs.

21 Claims, 4 Drawing Sheets

METHOD AND APPARATUS FOR DYNAMICALLY SAMPLING DIGITAL COUNTERS TO IMPROVE STATISTICAL ACCURACY

BACKGROUND OF THE INVENTION

1. Field of the Invention

This invention relates to the sampling of digital counters and more specifically to the dynamic adjustment of sampling times to achieve improved statistical accuracy.

2. Description of the Prior Art

The use of counters to collect various data concerning the operation of communication networks has become important in the management of such networks. For example such counters monitor the operation of the communication function in order to detect degradation, impending failure, and to detect the failure of the various network components and links.

As implied in the references mentioned below, many computer systems collect statistical data on job interarrival times, response times, disc and RAM accesses, CPU and other resource utilizations, job categories, packet sizes, etc. The data can be collected through the use of counters that are periodically sampled. When full probability distributions of such measures of system performance are required, a set of counters that are incremented in a cyclic or round robin fashion may be constructed. These counters are then sampled at a frequency which is the same as or faster than the incrementing cycle in order not to lose data.

*IBM Technical Disclosure Bulletin,* Volume 33, Number 6B, November 1990, pages 72–75, teaches a technique for counting error events over a fixed interval of time T. The count n is compared to a threshold N in order to manage a network by issuing alerts or alarms when certain criteria are met. The article does not discuss whether the error event sampling is to be in hardware or microcode, nor does it address resource utilization.

*IBM Technical Disclosure Bulletin,* Volume 34, Number 4A, September 1991, pages 51–52, teaches a hybrid hardware software implementation having a limited set of internal hardware counters which actually count the error events. Microcode is used to programmably connect the counters and to accumulate the counts into main storage. When a counter is half full, and/or when the event being counted is to be changed, the microcode adds the count to the appropriate field in main store and possibly switches the event being counted. The microcode can thereby use the same counter in timeslice mode to monitor more than one event. The timeslice period is also programmable but there is no mention of dynamically varying sample periods.

*IBM Technical Disclosure Bulletin,* Volume 35, Number 7, December 1992, pages 103–107, teaches a two stage method for managing link performance counters. One stage compares a count of errored seconds kept over a short period of time with a threshold value as described in the first reference mentioned above. The second stage accumulates and transforms data gathered over a long period of time by repeated operation of the first stage in order to detect the onset of subtle long-term transmission impairments without giving false alarms. There is no mention of dynamically varied sampling periods or statistical accuracy.

U.S. Pat. No. 4,996,871 teaches re-adjusting the frequency at which signals are sampled in response to any change in the phase of the velocity signal so that the sampling frequency remains an integral multiple of the fundamental frequency of the signals being sampled. Although this reference changes the frequency dynamically, the signals being sampled are not stochastic and therefore the method being used will not function properly in the applications wherein the invention finds utility.

A problem that exists with such monitoring systems is that the arrival of data is stochastic. If the system designer chooses a sampling period that will not adversely affect the system operation by sampling too often, there is a risk that the sampling may be too slow during busy periods, thereby seriously reducing the statistical accuracy of the distribution estimate. If the counters are sampled at a faster rate, the sampling itself begins to adversely affect the performance of necessary operations that take place while data is not arriving at a fast rate, but these operations may well be critical to the job being measured and therefore again reduce accuracy of the measurements.

SUMMARY OF THE INVENTION

The instant invention overcomes this and other problems by advantageously providing a sampling period that is short enough to provide optimum accuracy of the measurements while at the same time not so short as to load the processor and other resources adversely.

These advantages are accomplished by dynamically determining the optimum sampling period, based upon the level of activity of the process being measured.

As the level of activity of a measured process increases, the sampling is kept at a frequency that represents an optimum trade off between measurement accuracy and measured process performance. During periods of low activity of a measured process, the sampling frequency is kept at a minimum rate in order not to miss a significant amount of data when the measured process returns to a higher level of activity.

DETAILED DESCRIPTION

Figure 1:
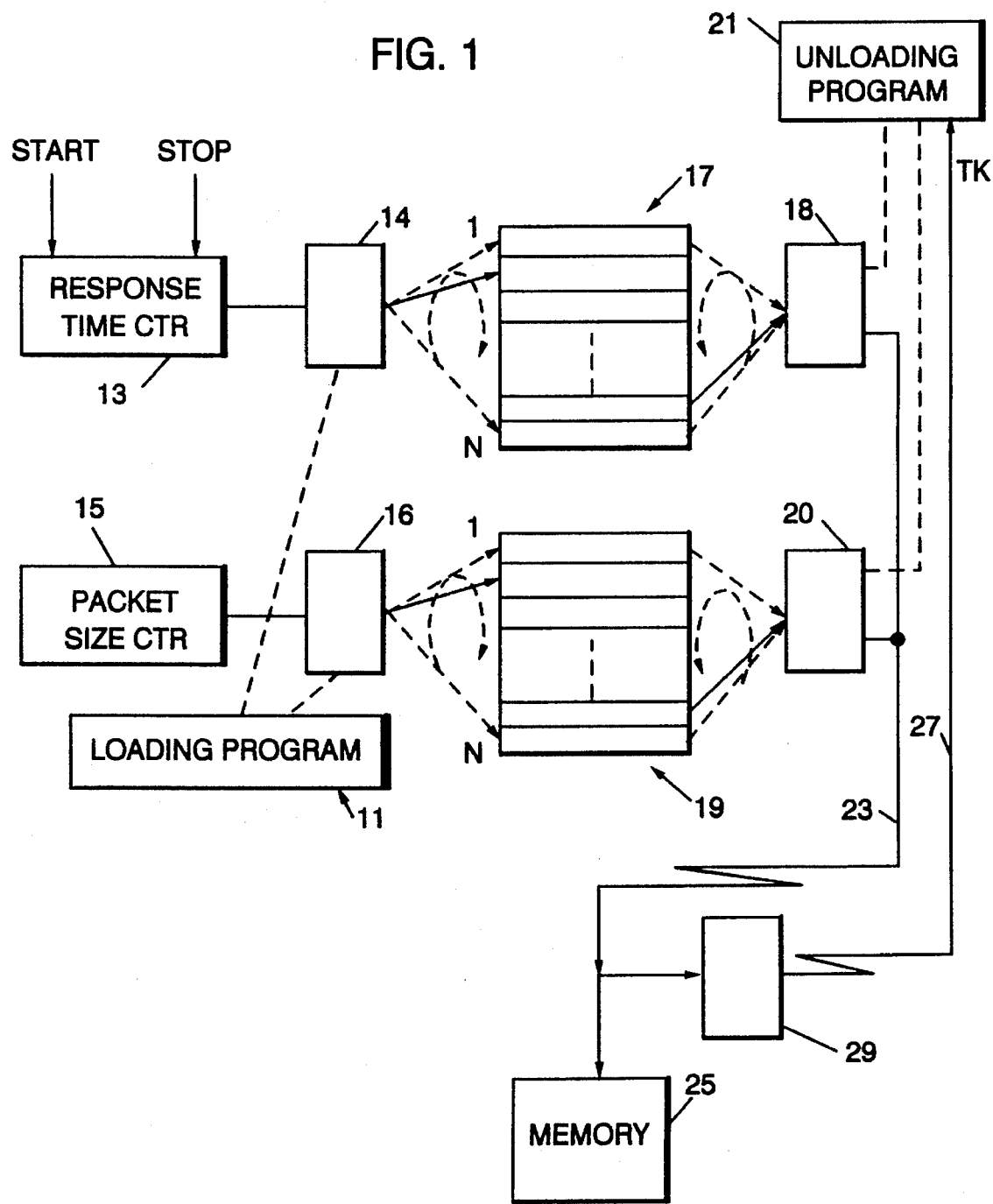
FIG. 1 is a block diagram of the data paths of an example system while being monitored.

FIG. 1 shows an example performance monitoring apparatus with the information being monitored coming in from the left and being moved to main memory at the lower right for processing by statistical application programs. In this example, the parameters being monitored are response time and packet size. Response time is generated by counter 13 which has a start input connected to receive a start signal from the transaction program when the enter key is pressed, and a stop input to receive a stop signal when the response is received by the transaction program. The start signal both resets the counter 13 and allows it to increment with time clock increments until the stop signal is received. Packet size is counted in counter 15 in a similar manner by starting the counter when the packet begins arriving and stopping the counter at the last byte. The output from counter 13 is connected to gate 14 and the output from counter 15 is connected to gate 16. A loading program 11 controls gates 14 and 16 to transfer the information from counters 13 and 15 to banks of registers 17 and 19, respectively, as will be explained in greater detail in the section labeled Operation of the Preferred Embodiment. In a similar manner, gates 18 and 20 are connected to the outputs of register banks 17 and 19 to multiplex these registers onto the memory bus of main memory 25 under control of an unloading program 21. The memory 25 may be part of the workstation, or it may be located at a central location from which a number of workstations are monitored. Toward this end, a data path 23 which may include a telecommunication link, connects the outputs of gates 18, 20 to memory 25 and to sampling time control 29 which is shown in greater detail in FIGS. 2 and 3. Control 29 generates the next sampling time interval which is connected via data path 27 to an input to the unloading program 21.

Figure 2:
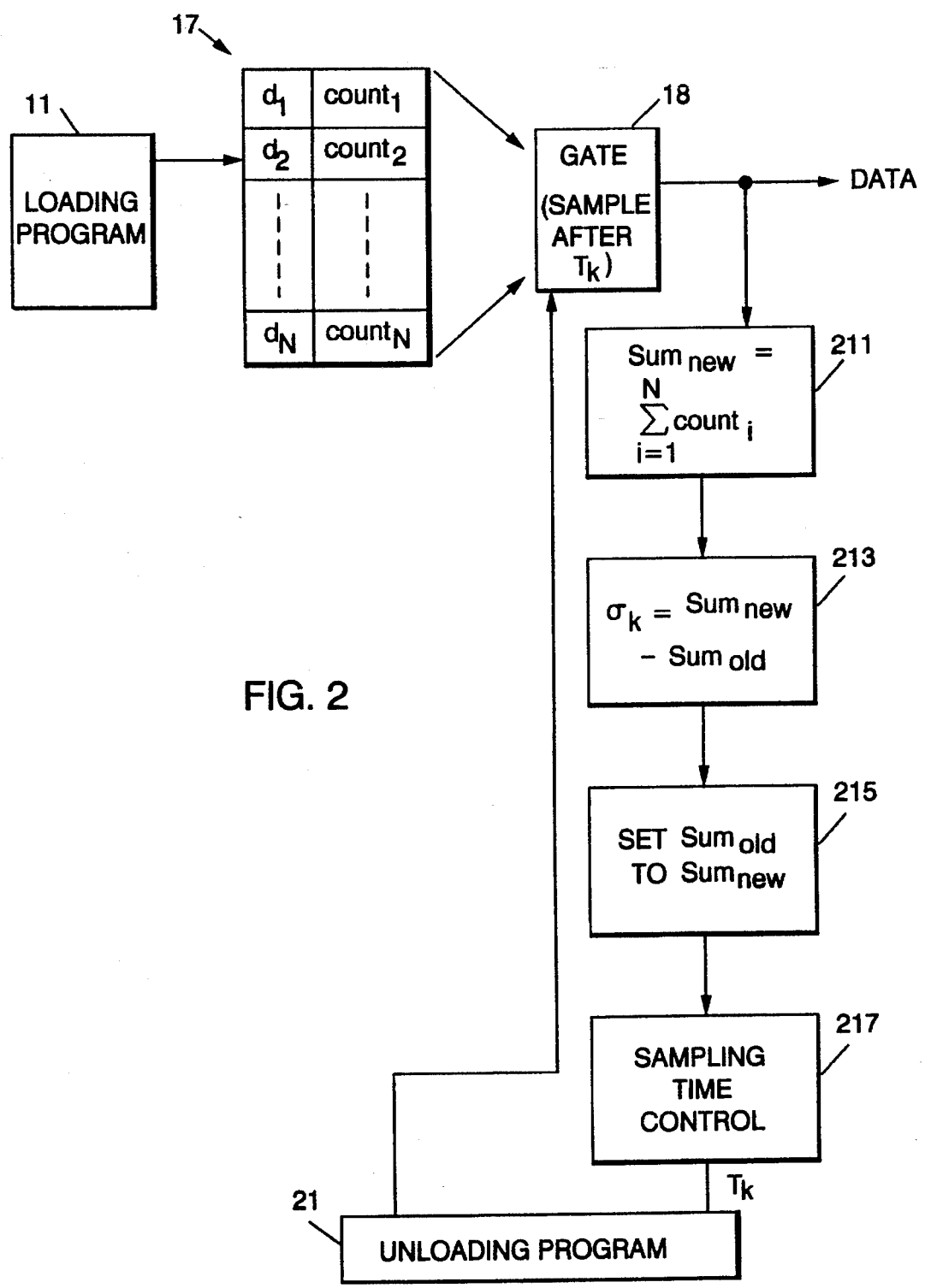
FIG. 2 is a block diagram with an expansion of the sigma calculation means of the invention.

Referring now to FIG. 2, the loading program 11 is again shown providing the input data to registers 17 which, in turn, are connected to gate 18. Unloading program 21 controls gate 18 to sample the data d1 through dN from the response time counter and the counts 1 through N cumulatively stored in the buffer registers 17. One of the counts 1 through N is incremented by the loading program each time that the associated register data accumulates. As each register is sampled, the count of the number of times that it has accumulated data since being previously sampled at T(k-1) is summed and the value sigma(k) is calculated in the blocks 211 through 215, which will be described in detail under Operation of the Preferred Embodiment. It will be recognized that the value sigma can be calculated locally at each terminal or workstation or sigma may be calculated centrally for the workstations. The content of the data fields and the increment count fields are not reset at each sample but are instead allowed to accumulate. Since both the data and the increment counts are generated by counters in our preferred embodiment, such accumulation occurs automatically. When the maximum count is reached, the counter merely rolls over to zero and continues counting. The statistical application programs which are not part of this invention will allow for this mode of operation by taking the difference between present and past values to obtain current response times and packet sizes.

OPERATION OF THE PREFERRED EMBODIMENT

In this example, two performance parameters are being monitored. They are response time and packet size. Each time that a transaction request is made at the terminal, for example as signified by the operator depressing the enter key, the response time counter 13 is started. When the response message is received, the counter 13 is stopped. The loading program 11 also responds to the response message to increment the count in register i of the ten registers 17 and to transfer the current count from the counter 13 to the data field associated with the register i of register bank 17 that was incremented. The next sequential one of these ten registers 17 is loaded by the loading program each time a transaction response is received at the terminal or workstation. After the tenth register is loaded, the sequence wraps back to register 1.

The loading program then increments a next count i in the bank of ten registers 19 shown in FIG. 1 and moves the packet size count as increased by the response message from the packet size counter 15 to the data field of register i of bank 19. The above-described steps are repeated each time that a response is received in response to a request, continuing to increment and increase the values of sequential registers 17 and 19. As previously described, the response time and packet size data in each register is not a specific new value but instead the data is allowed to accumulate. In this way, if the unloading program was not able to sample the incremented registers before they were used a second, third, or more times, data is not completely lost, but the granularity of the data is compromised as will be described in greater detail later in this specification.

After some period of time T(k) has elapsed, the unloading program 21 samples the registers 17 and 19 to gather the data which these registers have collected in conjunction with the loading program 11. The data is stored in main memory 25 for later processing by statistical application programs. It is in the dynamic selection of the optimum period of elapsed time T(k) that the invention finds utility in this embodiment.

Referring now again to FIG. 2, block 211 is the first step in determining how many of the total registers N have been used since the last time they were sampled at T(k-1). In some intervals, more than the total ten registers will have been used as the loading program incremented some registers more than once. When a register is used more than once during a sample time interval, data is not lost but has merely been accumulated into the register. However, the data which is attributable to each of the transactions can only be recovered as an average and therefore data granularity has been lost. In other intervals, less than the total of ten registers will have been used. At block 211, all of the ten counts are summed to obtain the value Sum(new).

Sigma(k) is calculated at block 213 as the difference between Sum(new) and the Sum(old) which is the same as the number of registers used this time. If more registers were used last time, that means that fewer transaction requests are being generated in our example, and the period of time between samples may be lengthened. If the difference between the new sum and the old sum is larger than the difference was last time, then more transactions are occurring, and there may be a need to sample more often. At block 215, the new sum is saved as the next old sum in preparation for calculating the next difference. At block 217, the sigma(k) value is used to generate a new sampling time T(k) which is then provided to the unloading program 21 which does the actual sampling via gates 18 and 20. Table 1 which follows sets out simple example values of data and counts for a group of five registers over five time periods in order to make the above explanation more clear.

TABLE 1

| Time | k-4 | k-3 | k-2 | k-1 | k |
|------|-----|-----|-----|-----|-----|
| d1 | 0 | 1 | 1 | 4 | 6 |
| d2 | 0 | 1 | 1 | 3 | 5 |
| d3 | 0 | 0 | 2 | 2 | 4 |
| d4 | 0 | 0 | 0 | 2 | 4 |
| d5 | 0 | 0 | 0 | 1 | 3 |
| count1 | 0 | 1 | 1 | 2 | 3 |
| count2 | 0 | 1 | 1 | 2 | 3 |
| count3 | 0 | 0 | 1 | 1 | 2 |
| count4 | 0 | 0 | 0 | 1 | 2 |
| count5 | 0 | 0 | 0 | 1 | 2 |
| sum | 0 | 2 | 3 | 7 | 12 |
| sigma | 0 | 2 | 1 | 4 | 5 |
| T | 3 | 3 | 12 | 11.5 | 8.7 |

In the example of Table 1, it is assumed that there are five registers in a group so N equals five. The desired number of registers n to use before sampling is chosen to be four. The system is started at k-4 and runs for four more intervals on the table. During the interval between k-4 and k-3, the response time is 1 second for each transaction. A total of two transactions occur so the values one and one are loaded into the data fields of the first two registers from the response time counter. Likewise, the counts in each of the first two registers are each incremented to 1 and 1, respectively. Recalling the block 211 in FIG. 2, it will be seen that the Sum value is two at k-3, and from block 213 it will be seen that sigma(k-3) is also two because sigma(k-4) was set to zero at startup time k-4. During the interval between k-3 and k-2, it is assumed that the response takes two seconds for ease of explanation. Therefore, the third register data field is loaded with the value two by the loading program 11 and the count in the third register is incremented. The sum then becomes three and the sigma is three minus two or one. The next transaction response between times k-2 and k-1 also takes 2 seconds so the loading program loads the fourth register with two. Likewise, the fourth register count is incremented to one. Let us assume that three more transactions occur in this time period with response times of one second, three seconds and two seconds. The loading program then loads register field d5 with one and wraps and loads d1 with four and d2 with three. The counts 5, 1 and 2 are incremented and the sum then becomes seven. From block 213 the sigma(k-1) is four.

At time k, five more transactions have occurred and to simplify the explanation let us assume that each response time was two seconds. The loading program 11 stores the response time counter values of four, four, three, six and five in d3, d4, d5, d1, and d2, respectively. Likewise, the loading program increments counts 3, 4, 5, 1, and 2 yielding a new sum of twelve. Since the old sum was seven, sigma(k) becomes 5, which is the number of transactions between k-1 and k.

Figure 3A:
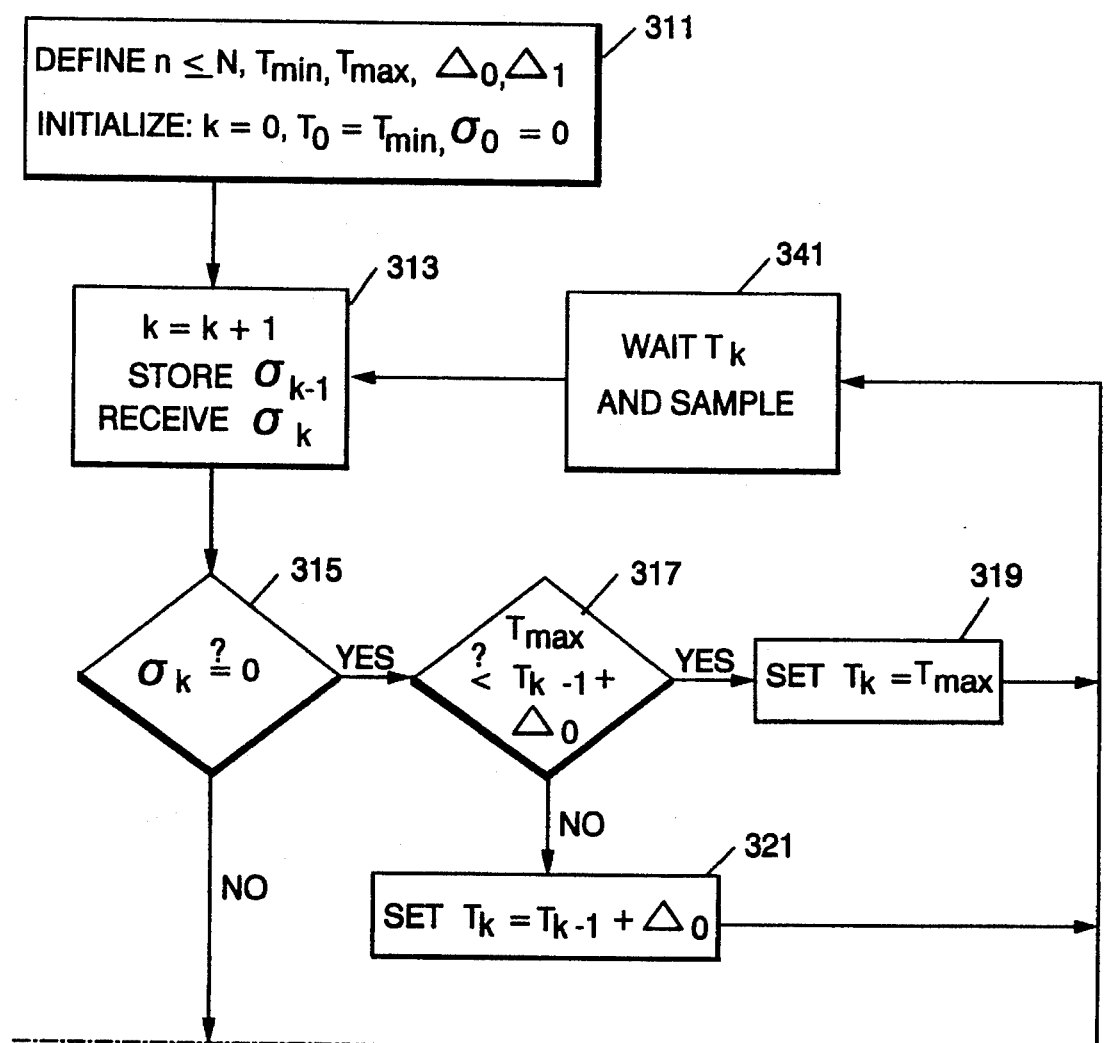
FIGS. 3A and 3B, connected as shown in FIG. 3 are blocks diagram showing the method of the invention.
Figure 3B:
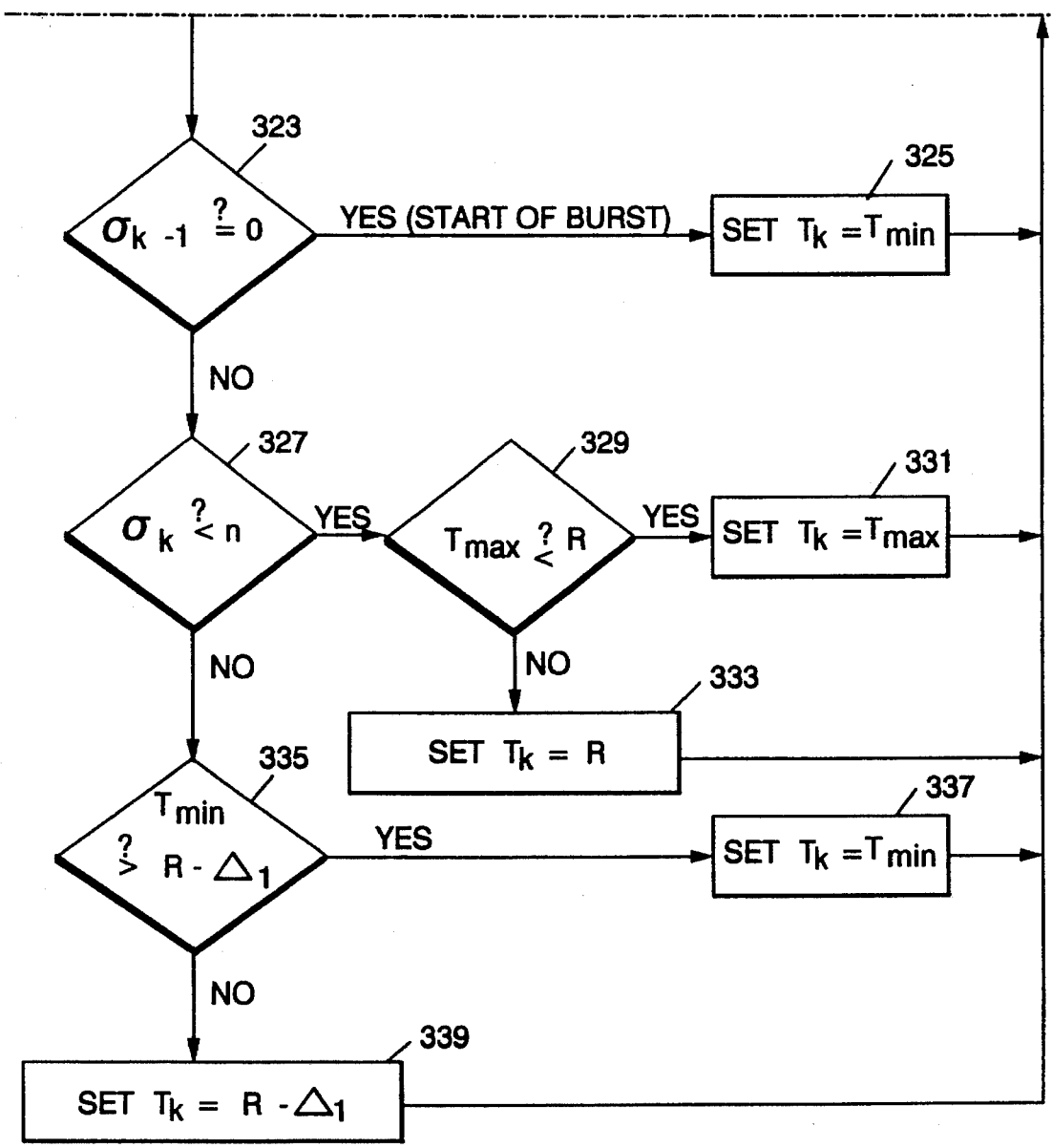

Referring now to the flow diagram in FIG. 3A, the method of the invention will be described in conjunction with an example useful application thereof. All of the steps and decisions of FIGS. 3A and 3B are implemented in programmed computer instructions. In block 311, the values of n, N, Tmin, Tmax, Delta0, and Delta1 are received from a constant table defined when the sampling control program 217 was installed. Also, the values k and Sigma0 are set to zero and T0 is set to equal Tmin thereby starting the monitor operation at the fastest sampling rate.

In the preferred embodiment, N is ten since there are ten physical registers in each bank 17 and 19 shown in FIG. 1. A value of n is chosen to be less than or equal to ten so that the sampling of the registers by the unloading program occurs before any of them have been loaded more than once to preserve data granularity. In the preferred embodiment n was chosen equal to nine.

Tmin is set to equal a minimum time between sampling and is determined empirically by trading off between losing some data granularity by sampling too slow and impacting the process itself by sampling so fast that resources are taken away from the process being measured. In our example, we chose a Tmin of 3 seconds.

Tmax is set to equal a maximum time between samples and is again determined empirically. This time Tmax is controlled by the likelihood that after some long period of low process activity, the process will resume activity at such a high rate that data will again lose granularity by coming in so fast that the registers 17 and 19 will be each incremented many times before the sampling time control program can determine that it must sample more often. The other side of this trade off is that while the process is relatively inactive, other processes are still quite active and the system operators do not want to adversely impact these other processes by monopolizing resources to monitor an inactive process. In our preferred embodiment, Tmax was chosen to be 20 seconds.

Delta0 and Delta1 are the values by which a new calculated sampling value R will be lengthen or shortened respectively to determine the next sample wait time T(k). These deltas are also chosen empirically by anticipating the rate of decrease and rate of increase of activity in the process being monitored. We chose Delta0 and Delta1 to each equal 0.5 seconds. R is equal to the previous time delay times the ratio of n over sigma. Sigma was calculated back at block 213.

At block 313, the sample interval counter k is incremented and the sigma for the previous time period, (now k-1) is stored for future reference. At this time the system is just starting out and the sigma(k-1) is whatever count happens to be in the counters of the register banks 17 and 19. Also at block 313, the new sigma(k) is measured as described above with respect to FIG. 2.

If at block 315, the new sigma is found to be zero, that means that the process being monitored has been inactive since the last time that the registers were sampled. If YES, the flow goes to block 317 where it is determined whether the last sampling time plus delta0 was greater than Tmax which is the slowest sampling rate which was empirically set. If YES, then the current sampling time delay T(k) is set to Tmax at block 319. If the answer is NO, then the current sampling time delay is set to the previous delay plus delta0 at block 321, thereby lengthening the time between samples.

If, at decision block 315, the answer was NO, then test at block 323 whether sigma(k-1), which is the number of registers used during the previous sampling time k-1, was zero. If YES, then the start of a burst has been detected and the next samples will be taken as soon as possible by setting T(k) to equal Tmin at block 325.

If, at decision block 323, the answer was NO, then the method looks at block 327 to determine if Sigma(k) was less than n. If Sigma(k) is less than n, the sampling of the registers by the unloading program is occurring faster than it needs occur in order to optimize data granularity yet not waste system resources. Therefore, following the YES output from decision block 327, to another decision block 329, the method calculates a resultant time R which is T(k-1) times the ratio of n over sigma(k). The method is biased toward adequate sampling to preserve data granularity and, therefore, it lengthens the time but does not exceed Tmax. At block 329, the amount is tested to determine whether it exceeds Tmax. If the answer is YES, then the time is only lengthened to Tmax at block 331.

If the amount R is less than Tmax, then the current time delay T(k) before sampling again is set to the newly calculated amount R at action block 333. The calculated amount is the product of the previous time delay and the ratio of the optimum number of registers n to be used over the number of registers actually used last time. In our example, n is equal to nine so if only four registers had been incremented, the next time delay will be set to approximately twice as long.

Returning now the block 327, if Sigma(k) is not less than n, that means in this case that it must be either nine or greater and the time should be shortened to maintain data granularity. Following the NO output from block 327 to decision block 335, the calculated shortened time R minus delta1 is compared to Tmin. If Tmin is greater than the calculated amount, the next time delay T(k) is set to Tmin at action block 337. If on the other hand, Tmin is less than the calculated amount, then T(k) is set to the calculated amount R minus the preset value of delta1 at action block 339. The calculated amount R is still the product of the previous time delay and the ratio of n over sigma(k-1). Thus, if Sigma(k) is nine, the optimum number of registers are being used and the time delay T(k-1) is multiplied by one therefore R remains the same as T(k-1) but just to make sure that data granularity is preserved, the time is reduced by delta1. Of course, the value of delta1 can be preset to zero in which case T(k) will equal T(k-1).

The output of all of the action blocks 319, 321, 325, 331, 333, 337, and 339 return control to the unloading program 21 which waits at block 341 for the time period T(k) before sampling the registers 17 and 19 again.

In Table 1, N=five and n=four. In order to complete the table with row T(k), the values of the preferred embodiment: Tmin=3 seconds, Tmax=20 seconds, Delta0 and Delta1 both equal to 0.5 seconds are used in that simplified example.

At k-3 and following the blocks 315, 323, 325 of FIG. 3, then T(k-3)=Tmin which we have chosen to be three seconds.

At k-2 and following the blocks 315, 323, 327, and 329, Tmax of 20 is not less than R since R is (4/1)T(k-3) or 4 times 3 and therefore at block 333, T(k-2) is then set to 12.

At k-1 and following blocks 315, 323, 327 and 335 sigma (k-1) is not less than n and Tmin is not greater than R which is (4/4)12 minus delta1 so T(k-1) is set to 11.5, and the system waits that time before sampling the five registers again. At k, and following blocks 315, 323, 327, and 335, T(k)=((4/5)11.5)–0.5=9.2–0.5 or 8.7.

Having described the invention in terms of a preferred embodiment thereof, it will be recognized by those skilled in the art of computer peripheral equipment design that various changes in the structure and programming of the implementations described can be made without departing from the spirit and scope of the invention which is measured by the following claims.

What is claimed is:

1. Apparatus for collecting data on performance of operations by a computer system operating at an operation rate, said apparatus comprising:

a group of data storage means for accumulating performance information concerning the performance of operations by the computer system;

means for placing said performance information in selected ones of said data storage means at the operation rate of the computer system;

means for transferring said performance information accumulated in said group of storage means to a processing storage means at a sampling rate which is a function of the operation rate at which said performance information is being placed in said group of storage means; and said processing storage means for storing said performance information for later processing.

2. The apparatus of claim 1 further comprising:

means for calculating a value R which is the product of a previous time period and the ratio of a desired number of times n that said performance information is to be placed in said group of storage means over an actual number of times that information is being placed in said group of storage means.

3. The apparatus of claim 2 wherein said means for transferring waits for said time period R after transferring said information before again transferring said information.

4. The apparatus of claim 3 wherein said means for transferring waits for a period of time Tmax when said R is greater than said Tmax.

5. The apparatus of claim 3 wherein said means for transferring waits for a period of time Tmin when said R is less than said Tmin.

6. The apparatus of claim 3 wherein said means for transferring waits for a period of time of said R minus a predetermined value delta1 when said ratio is less than the integer of one but said R minus said delta1 is greater than a period of time Tmin.

7. The apparatus of claim 1 wherein said selected ones of said storage means are selected sequentially.

8. The apparatus of claim 7 wherein said means for placing information places cumulative information in each storage means of said group of data storage means.

9. The apparatus of claim 1 wherein said means for placing information also places a count of the number of times that said performance information has been placed in said group of storage means.

10. The apparatus of claim 9 wherein said means for transferring waits for a previous time period plus a predetermined value delta0 when said previous time period plus said delta0 is less than a period of time Tmax.

11. A method for sampling data on transaction processing by a computer system comprising the steps of:

loading processing information concerning a transaction of the computer system in selected storage devices of a group of data storage devices at a transaction rate which is related to transaction processing by the computer system; and unloading said processing information accumulated in said group of storage devices at a sampling rate which is a function of the number of times that information is being placed in said group of storage devices by said loading step.

12. The method of claim 11 wherein said step of transferring further comprises the step of:

calculating a value R which is the product of a previous time period and the ratio of a desired number of times n that information is to be placed in said group of storage devices over said number of times that information is being placed in said group of storage devices.

13. The method of claim 12 wherein said step of unloading waits for said time period R after unloading said information before again unloading information.

14. The method of claim 13 wherein said step of unloading is delayed for a period of time Tmax when said R is greater than said Tmax.

15. The method of claim 14 and in addition:

said step of unloading is delayed for a period of time Tmin when said R is less than said Tmin.

16. The method of claim 15 and in addition:

said step of unloading is delayed for a previous time period plus a predetermined value delta0 when said previous time period plus said delta0 is less than said Tmax.

17. The method of claim 16 and in addition:

said step of unloading is delayed for a period of time of said R minus a predetermined value delta1 when said ratio is less than the integer of one but said R plus said delta1 is greater than said Tmin.

18. The method of claim 11 wherein said storage devices are data registers and said step of loading processing information loads transaction performance data into sequential registers of said group of data registers.

19. The method of claim 18 wherein said step of loading processing information loads cumulative transaction performance data in each data register.

20. The method of claim 11 further comprising the step of placing a count of the number of times that processing information has been loaded into said group of storage devices.

21. A storage medium storing a computer process for sampling information from a group of data storage locations at a rate which is a function of the number of times that information is being placed in said group of storage locations, said process comprising the computer implemented steps of:

calculating a value R which is the product of a previous time period and the ratio of a desired number of times n that information is to be placed in said group of storage means over said number of times that information is being placed in said group of storage means;

waiting for said time period R after transferring said information before again transferring information;

delaying said transfer for a period of time Tmax when said R is greater than said Tmax;

delaying said transfer for a period of time Tmin when said R is less than said Tmin; and delaying said transfer for a period of time of said R minus a predetermined value delta1 when said ratio is less than the integer of one but said R plus said delta1 is greater than said Tmin.

\* \* \* \* \*